(12) United States Patent
Neu et al.

(10) Patent No.: US 9,603,302 B2
(45) Date of Patent: Mar. 28, 2017

(54) AGRICULTURAL WORKING MACHINE HAVING A DISPLAY DEVICE

(71) Applicant: CLAAS SELBSTFAHRENDE ERNTEMASCHINEN GMBH, Harsewinkel (DE)

(72) Inventors: Sebastian Neu, Bad Laer (DE); Michael Losch, Versmold (DE); Stefan Teroerde, Warendolf (DE); Klaus Schaefer, Oelde (DE); Bernd Holtmann, Sendenhorst (DE); Joachim Baumgarten, Beelen (DE); Markus Brune, Harsewinkel (DE); Waldemar Thiesmann, Osnabrueck (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 99 days.

(21) Appl. No.: 14/493,463

(22) Filed: Sep. 23, 2014

(65) Prior Publication Data
US 2015/0088386 A1 Mar. 26, 2015

(30) Foreign Application Priority Data
Sep. 26, 2013 (DE) .................. 10 2013 010 610

(51) Int. Cl.
A01D 41/127 (2006.01)
G01D 7/06 (2006.01)

(52) U.S. Cl.
CPC ............ *A01D 41/127* (2013.01); *G01D 7/06* (2013.01)

(58) Field of Classification Search
USPC .......................................... 701/50
See application file for complete search history.

(56) References Cited

U.S. PATENT DOCUMENTS

| 8,108,110 B2 * | 1/2012 | Jeppe ............... A01D 41/12 56/1 |
| 8,370,742 B2 * | 2/2013 | Hieronymus ........ A01D 41/127 715/702 |
| 2008/0288144 A1 * | 11/2008 | Jeppe ............... A01D 41/12 701/50 |
| 2010/0125788 A1 * | 5/2010 | Hieronymus ........ A01D 41/127 715/702 |

FOREIGN PATENT DOCUMENTS

| DE | 673563 C * | 3/1939 | ............ G01D 7/04 |
| DE | 19909163 A1 * | 9/2000 | ............ G01D 7/04 |
| DE | 102005015178 A1 * | 10/2006 | ............ B60K 35/00 |
| DE | 10 2007 022 899 | 11/2008 | |
| EP | 2 186 394 | 5/2010 | |

\* cited by examiner

*Primary Examiner* — Shelley Chen
(74) *Attorney, Agent, or Firm* — Michael J. Striker

(57) ABSTRACT

An agricultural working machine has at least one working unit and a display device for displaying or adjusting parameters of the working machine the at least one working unit of both. The display device has a display unit with jointly depictable display elements for visualization of parameter-based values, the display elements preferably arranged concentrically in a form of circular-ring sections. The display device also includes at least one bar display that at least partially encircles the display elements radially on the outer side. Indicator element for displaying a defined value are disposed on the at least one bar display.

11 Claims, 2 Drawing Sheets

AGRICULTURAL WORKING MACHINE HAVING A DISPLAY DEVICE

CROSS-REFERENCE TO A RELATED APPLICATION

The invention described and claimed hereinbelow is also described in German Patent Application DE 10 2013 110 610.2, filed on Sep. 26, 2013. The German Patent Application, the subject matters of which is incorporated herein by reference, provides the basis for a claim of priority of invention under 35 U.S.C. 119(a)-(d).

BACKGROUND OF THE INVENTION

The present invention relates to an agricultural working machine having at least one working unit and one display device for displaying or adjusting parameters of the working machine or the working unit in a way that the parameter-based values are visualized.

A display unit of the display device shows an operator of an agricultural working machine, via display, a plurality of parameters of the working machine, for example, the ground speed or the fuel consumption, and a plurality of parameters of the individual working units, for example, the adjustment parameters thereof: The operator must observe the displayed parameters in order to detect failures at an early point in time and to keep the performance of the machine as high as possible. In order to ensure the performance of the working machine under constantly changing external influences, the operator must not only engage in continuous monitoring, he/she must also decide which parameters must be adjusted, and how.

Document EP 2 186 394 A1 shows a display unit for displaying operating parameters of an agricultural machine, wherein the display unit is designed to display a plurality of subsections, to each of which an operating parameter is assigned. In a first operating state of the working unit, a closed main area having a central geometric focal point are displayed, and a first subsection is laterally limited by a second subsection. In a second operating state of the working unit, the mean distance between one side of the first subsection and the central geometric focal point is changed. When the operating state changes, the view of the displayed subsections becomes fragmented, which can make it difficult for the operator to compare functionally interrelated parameters.

Document DE 102007022899 A1 discloses an agricultural working or harvesting machine comprising at least one working unit and a driver's cab in which a plurality of machine and/or crop parameters set up in different functionality windows is visualized via a basic electronic display area depicted in at least one a display unit. The basic display area is activated and controlled by an operating device, wherein, in the working or harvesting mode at least, at least one additional display area which includes a functionality window and is superimposed on the basic display area is displayable in the display unit, wherein the additional display area and the at least one functionality window is activated and controlled by at least one separate operating device. Although additional information can be displayed by activating an additional window, information that is already on display is covered thereby. In addition, the operator is unable to observe the additionally displayed information in a lasting manner.

SUMMARY OF THE INVENTION

The present invention overcomes the shortcomings of known arts, such as those mentioned above.

To that end, the invention provides a display device that allows a simultaneous, transparent display of a plurality of parameters in order to provide an operator of an agricultural working machine an improved overview of relevant processes.

In an embodiment, the display unit comprises concentrically arranged display elements in the form of circular ring sections and at least one bar display. The bar display at least partially encircles the display elements radially on the outer side. It is therefore possible to depict a plurality of parameters in a compact and particularly transparent form, thereby enabling the operator of the working machine to see all relevant parameters in one glance. Due to the graphically closed, adjacent arrangement of the flat display elements, which are encircled by the bar display on the outer side, the operator can easily locate and compare parameters, in particular, by the flat display of the values. This makes it possible to quickly locate the information required to adjust a working unit, for example, without further conversion of the numerical values.

The bar display also makes it possible to show the operator a further parameter-based value in a specially emphasized position, which, due to the encircling arrangement on the outer side, provides the operator with a quick overview of the value and/or the tendency of the value of the underlying parameter to change. Given that the bar display is elongated and, in particular, has the shape of a circular arc, it is possible to make even slight changes in the underlying parameter clearly visible to the operator. Indicator elements, which is arranged along the scale of the bar display, make it possible to clearly and unambiguously display or characterize defined values that may be of particular interest for the operator. The indicator elements can depict minimum values and/or maximum values, for example, limit values, which should not be fallen below or exceeded. The indicator elements also can depict parameters and/or working units that exert an influence that is limiting, in particular, on the parameter depicted by the bar display. The operator can therefore immediately recognize, without having to give further consideration thereto, whether action must be taken and, if so, what action must be taken (for example, in order to affect a limiting influence on the displayed parameter).

In an embodiment, the size of the display area of the display element is dynamically adjusted according to a change in the assigned parameter, thereby enabling the operator to identify a change at a glance without precisely reading numerical values, for example, thereby ensuring a fatigue-proof display of information, in particular during relatively long periods of work.

The formation of subsections, to which individual parameters are assigned, makes it possible to depict, in a transparent manner, functionally interrelated parameters individually and in direct association with an overall result. Detailed information, for example, on a single parameter, can therefore be presented to the operator without reducing the transparency of the display unit.

Given that the subsections assigned to a display area represent a loss display, the subsections comprise at least the loss of a cleaning device and the loss of a separating device and the sum of the subsections in the radial direction represents the total loss of the agricultural working machine, it is ensured that the operator of the agricultural working machine can visually determine, at a glance, whether the total losses of the agricultural working machine are in an acceptable range, In an embodiment, the subsections assigned to a display area represent a tailings display, the subsections comprise at least the total volumetric flow of tailings, as a tailings display, the grain volumetric flow rate as grain tailings, and the area ratio of the subsections relative to one another corresponds to the relative ratio of the total volumetric flow rate of the tailings to the grain tailings of the agricultural working machine. Such a display structure has the effect, in particular, that the operator recognizes at a glance whether the grain portion in the tailings infers good cleanliness of the grain and a low portion of damaged grain, since a grain portion that is too high indicates a strong trend toward damaged grain, whereas a grain portion that is too low indicates that the purity of the grain has worsened.

Given that a minimum and/or maximum value of a display element is displayed, it is possible to simplify a visual inspection of the display elements and the underlying parameters, since the area of the display element can be immediately compared with a limit value, which can be displayed inside and/or outside of the display area of the display element, for example, in the form of a boundary line.

In an embodiment, the display unit comprises a central display, thereby making it possible to present certain information to the operator in an emphasized manner.

Pictograms are assigned to the display elements and/or indicator elements and thereby make it easier for the operator to associate the respective display element and/or indicator element to an assigned parameter or working unit.

Given that the parameters and/or working units assigned to the display elements, indicator elements and/or pictograms are manually or automatically adjusted, in particular, by selecting an associated display element, indicator element and/or pictogram, the operator is able to select the corresponding display element, indicator element or pictogram at any time and enter settings for the underlying, controllable parameters without negatively affecting the flow of information.

In addition, the operator of the agricultural working machine can then quickly determine the efficiency of the working machine and implement efficiency-improving measures, if necessary, provided that the central display visualizes the maximum output of the agricultural working machine, preferably a harvesting output in tons/hectare, and/or a relative utilization of the agricultural working machine in percent.

This effect can also be enhanced even further when the position of the respective indicator element corresponds to the maximum performance of the respectively visualized parameter and/or working unit, thereby making it possible for the operator to quickly identify the performance-limiting working mechanism and initiate suitable countermeasures.

In addition, the display unit can be changed and/or expanded, making it possible to configure the display unit in an individualized manner that is tailored for a special working process of the working machine. This ensures that the operator is only displayed the information that is relevant to him or her, and therefore the transparency of the display unit and the display device can be further improved.

The display element advantageously comprises a main area for the display of the display elements, indicator elements and/or the bar display. This makes it possible to specify a basic visual structure for the arrangement, for example, of the display elements, within which the display elements can be arranged. It is thereby further possible to avoid visually overloading the display with information and, simultaneously, to specify a basic structure for the arrangement of the display elements, in particular, that is optimal for information acquisition.

In an embodiment, the agricultural working machine comprises a control/regulating unit, which is known from the prior art and can be connected to the display device, for the monitoring and control of the parameters.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
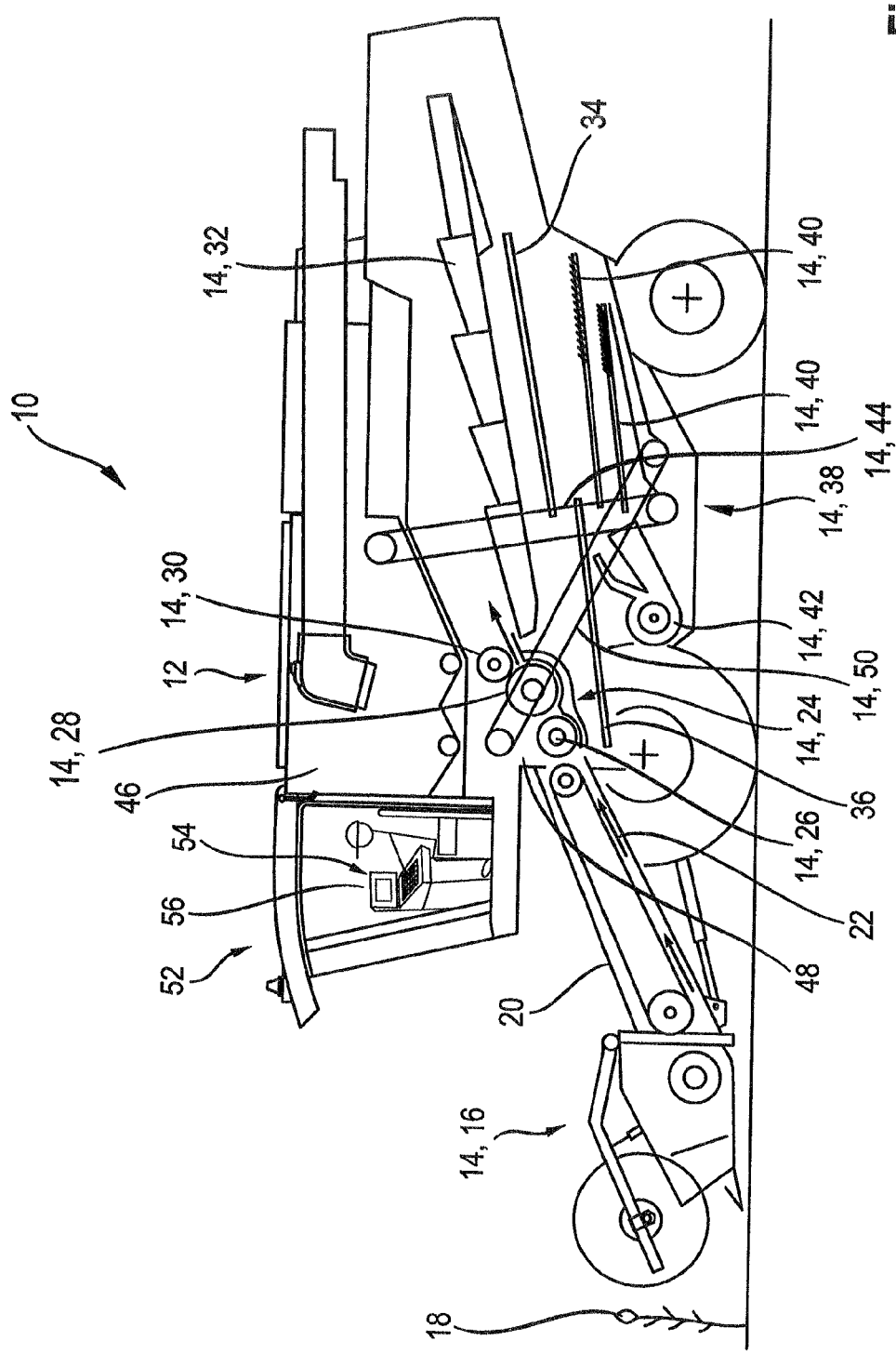
FIG. 1 shows a schematic cross-section of an agricultural working machine in the form of a combine harvester.

FIG. 1 shows an agricultural working machine 10 in the form of a combine harvester 12 and the different working units 14 thereof. A header 16 is disposed in a front region of the combine harvester 12, which picks up and cuts crop 18 and conveys the crop to a feed rake 20. Via the feed rake 20, the crop 18 is conveyed as a crop stream 22 to the threshing parts 24, wherein the threshing parts 24 comprise a first cylinder 26 and a second cylinder 28. A guide drum 30 disposed downstream of the threshing parts 24 conveys the crop stream 22 to a separating device 32 in order to separate grains still present in the crop stream 22.

It lies within the scope of the invention that the separating device 32 depicted in the exemplary embodiment as a tray-type shaker also can be embodied as a separating rotor, which is known per se and is therefore not shown. The grains separated out in the threshing parts 24 and the separating device 32 are fed to a cleaning mechanism 38 via a return pan 34 and a feed pan 36. The cleaning mechanism 38 comprises a plurality of cleaning sieves 40 and a fan 42. Cleaned grains are transported via an elevator 44 into a grain tank 46. Components of the crop stream 22 that have not dropped through the cleaning sieves 40 but, instead, were conveyed out of said cleaning sieves, are fed as tailings 48 back to the threshing parts 24 by a tailings conveyor device 50. The header 16, the feed rake 20, the threshing parts 24, the separating device 32, the cleaning mechanism 38, the elevator 44, the grain tank 46 and the tailings conveyor device 50 are examples of working units 14 of the agricultural working machine 10.

A display device 54 for displaying and/or adjusting parameters of the working machine 10 and/or the working units 14 is disposed in a driver's cab 52 of the combine harvester 12. The display device 54 is connected to a control/regulating unit known from the prior art, in particular, to permit the monitoring and regulation of the parameters. In order to optimize the settings of the parameters, in particular, in order to set a process implementation strategy, the agricultural working machine 10 comprises a driver assistance system 28, which is connected to the display device 54 and which presents suggestions for the manual and/or automatic optimization of the parameters and/or processes to an operator of the agricultural working machine 10, Displayable and/or adjustable parameters of the working machine 10 and/or the working units 14 are, for example, a ground speed, the fuel consumption, operating and/or adjustment parameters of a working unit 14, without limitation. The parameters can have an absolute or relative value. A parameter also can be a weighting variable based on an evaluation of different data, for example, a weighting variable for the utilization of the machine or the maximum performance of the working machine 10 at certain settings. The visual display of the parameters, in particular the value of the parameters, on the display device 34 makes it possible for the operator of the working machine 10 to control and implement adjustments on the working units 14, for example, in order to adapt the harvesting capacity of the working machine 10 to the specific crop conditions.

Figure 2:
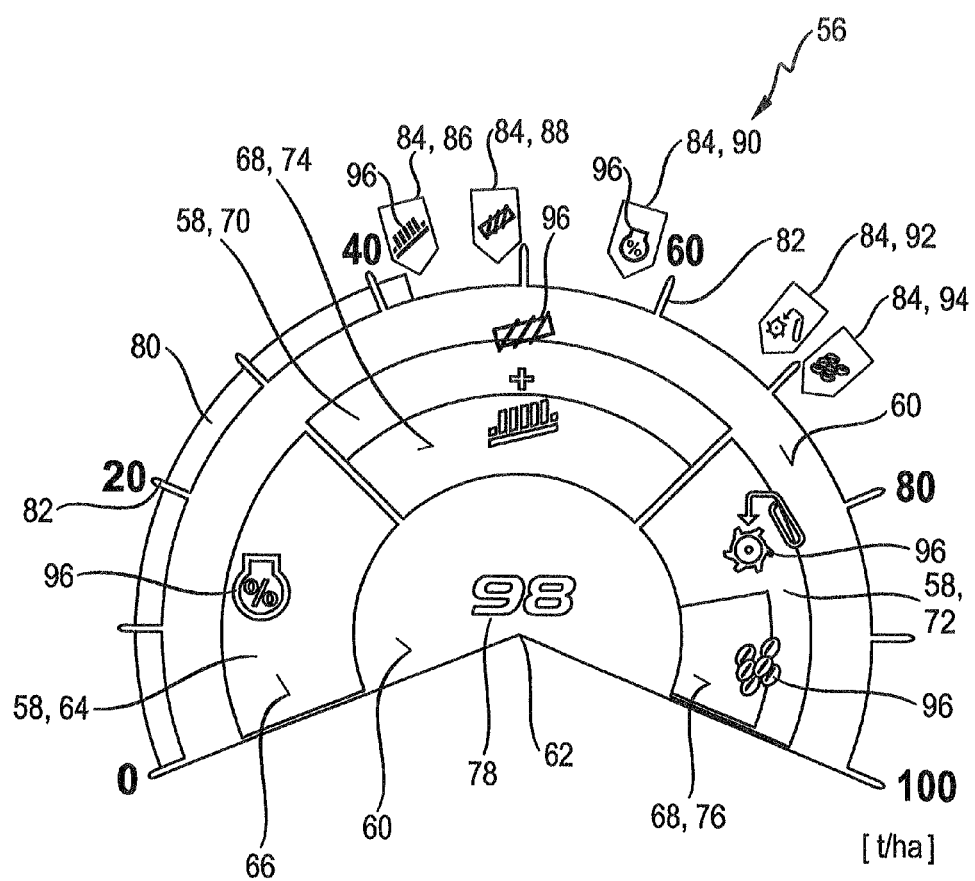
FIG. 2 shows a schematic depiction of a display device comprising a display unit having a plurality of display elements.

The display device 54 comprises at least one display unit 56 having jointly depictable display elements 58 according to FIG. 2 for the visualization of current values of certain parameters of the agricultural working machine 10 and/or the working units 14. The display elements 58 are displayed on a screen (not illustrated) of the display device 54 and designed to be actuatable and/or adjustable, for example, in order to adjust parameters. The display device 54 may comprise a touch-sensitive touchscreen monitor in order to simplify the operation and/or interaction with display elements 58, the bar display 80, and/or indicator elements 84, but is not limited to a touch sensitive touchscreen.

The content of the display unit 56 depicted in FIG. 2 is provided as an example and is described in more detail in the following. The display unit 56 shown comprises three display elements 58, which are concentrically arranged on a closed main area 60. The main area 60 has an angle of opening of approximately 225 degrees about a center point 62. The display elements 58 are each designed as circle subsections, wherein the display elements 58 are limited by at least one circular arc and two circle radii, which enclose an angle of opening, or sections of circle radii. The display elements 58 depicted in FIG. 2 are embodied in the form of circular-ring sections. The circular-ring sections are each limited radially on the inner and outer side by a circular arc and in the tangential, lateral direction by circle radii, thereby delineating a display area 66 of a circular-ring segment-shaped display element 58 in each case.

The display elements 58 are concentrically disposed about the center point 62 such that the display elements 58 are disposed adjacently next to one another and, together, form at least one partial circular ring. An overall extension, in particular in the tangential and/or radial direction, of the thusly formed circular ring or circular-ring section remains unchanged even if the individual display elements 58 change and/or if the number of display elements changes.

The embodiment of the display elements 58 in the form of concentrically disposed circular-ring sections further improves the transparency of the display unit 56, since the display area 66 of a display element 58 can be reduced, for example, relative to a circle section, without the loss of information for the operator of the working machine 10. In addition, the circular-ring sections can be disposed in a more transparent manner, for example, in the form of a ring or a circular-ring section.

In order to visualize a certain parameter, the display area 66 of a display element 58 is proportional to the size of the current value of the parameter to be displayed. It is therefore possible, for example, to display the utilization of an engine of the agricultural working machine 10 by an engine-utilization display 64, wherein the utilization of the engine is depicted as a percentage value by a display area 66 having a corresponding size. The display elements 58 are dynamically adapted to the value to be visualized, wherein the display area 66 is adjusted according to the change in the underlying value. In the case of a change in size, the display area 66 is changed in the radial and/or tangential direction, for example. In the case of a dynamic adjustment of a display element 58, a center of area of the display area 66 can remain stationary or is displaced in the radial and/or tangential direction. In addition or as an alternative thereto, a parameter to be visualized is displayed and/or changed by a certain color and/or a change in the color of the display area 66 of the display element 58.

In order to visualize pooled values, for example, a total value of a plurality of parameters or a certain parameter of a more comprehensive weighting variable, the display elements 58 comprises subsections 68, each of which are assigned to a single parameter. The subsections 68 are displayed, for example, within the dimensions of the display area 66 representing the total value. Pooled values are, for example, a loss display 70 and a tailings display 72 depicted in FIG. 2. The loss display 70 shows the pooled losses occurring in the separating device 32 and in the cleaning mechanism 38, wherein the losses occurring in the cleaning mechanism 38 are depicted as a separate subsection 68 of a loss subsection 74.

The remaining portion of the loss display 70 not covered by the loss subsection 74 corresponds to the loss occurring in the separating device 32. The loss subsection 74 is smaller and is embodied as a circular-ring section having the same angle of opening as the loss display 70 and is disposed radially inwardly in the loss display 70. As a result, an area ratio between the area of the loss subsection 74 and the remaining area of the loss display 70 is formed, which enables an operator to see the respective loss portions in the separating device 32 at first glance. The depiction by areas enables the operator to more easily see the losses than is the case with a display solely of numerical values.

The tailings display 72 also comprises an area that corresponds to the total tailings 48, wherein at least one grain tailings 76 is embodied as a subsection 68 in the tailings display 72 in order to depict the pool of tailings 48. This enables the operator to quickly see how high the portion of grain is in the tailings 48. The subsection 68 of the grain tailings 76 is shorter in the radial direction and has a smaller angle of opening than the tailings display 72 and is disposed on a side radially inwardly within the tailings display 72. A plurality of subsections 68 is disposed within a display element 58, wherein at least one part of the display area 66 of the display element 58 is covered. The subsections 68 can be highlighted by color within the display area 66 to permit easier identification thereof. Changes in size of a subsection 68 are depicted in the same manner as a change in size of a display area 66.

The minimum and/or maximum value of a display element 58 and/or a subsection 68 is displayed, for example, by boundary lines disposed tangentially, radially inwardly and/or outwardly. The boundary lines have the shape of a circular arc in particular and can each depict a minimum or maximum value of the parameter or parameters displayed. Likewise, a color change of a subsection 68 can correspond to a change in the underlying parameter, wherein certain color changes are assigned to certain parameter-related values, for example, limit values.

The display element 58 also can be delineated by the main area 60, wherein the display area 66 of one or more display elements 58 can be scaled, in the radial direction in particular, such that the main area 60 becoming filled and/or an edge of the main area 60 being reached in the radial direction can correspond to a maximum value or limit value of the visualized parameter. For example, the motor utilization display 64 can be scaled such that, in the case of a maximum value, the display area 66 touches the radially outermost edge of the main area 60.

The display unit 56 also comprises a central display 78, which is disposed adjacent to the center point 62 and radially inwardly of the display elements 58 on the main area 60. The central display 78 is used to depict a relative or absolute value of one or more parameters in a particularly transparent manner numerically or graphically in a dynamically adjustable area, thereby making it much easier for an operator to see this value. The value displayed in the central display 78 is a relative value, which is related to a dynamically adjustable maximum output of the working machine 10 and the working units 14. The operator can therefore determine, at a glance, what percentage of maximum obtainable harvesting output he is obtaining with the current settings or whether he has already reached the maximum output that can be obtained with the current basic conditions and settings.

The dynamically adjustable maximum output takes into account, in particular, all the parameters that influence the performance of the working machine and may limit the maximum possible performance. It is also feasible that the central display 78 displays a weighting variable in the form of an output of the working machine 10 and the working units, wherein, in the case of the combine harvester 12, the harvesting output can be indicated and displayed in harvested tons per hectare (t/ha).

At least one parameter-related, circular arc-shaped bar display 80 is disposed radially outwardly of the display elements 58. The bar display 80 is disposed outside of or inside the main area 60, for example, adjacent to and/or adjoining the main area 60 and/or the display elements 58, and is adapted to the outer shape thereof, for example, in the shape of a circular arc. The bar display 80 at least partially encircles the display elements 58 radially outwardly. The bar display 80 has a parameter-dependent scale 82, wherein the value to be displayed is dynamically displayed in the form of a bar.

The bar display 80 displays the value of a parameter, for example, a parameter that is already assigned to a display element 58 or a further, additional parameter. A plurality of bar displays 80, which are disposed in parallel, for example, are assigned to different parameters. The bar display 80 can visualize, in particular, a parameter or value that is essential to the harvesting output of the working machine 10. For example, the bar display 80 can display the relative value displayed in the central display 78, which is related to a maximum value that can be achieved if the settings are unchanged, and, in addition, as an absolute value by a dynamically adaptable bar. The scale 82 can be configured for an absolute, maximum output of the working machine 10 and the working units, wherein, for example, the grain throughput can be quantitatively displayed in harvested tons per hectare (t/ha).

Indicator elements 84 are used to display and/or mark defined values, on the bar display 80, of the parameter visualized by the bar display 80. The indicator element 84 is assigned to a certain parameter and/or working unit 14, wherein the defined value displayed by the indicator element 84 is based on the respective assigned parameter and/or working unit 14. The defined value is dynamically displayed as a function of a change in the parameter and/or working unit 14. The value that is displayed by the bar display 80, for example, the grain throughput, is limited if a setting of the working machine 10 and the working units 14 is given and unchanged.

The parameters and/or working units 14 that influence and may limit the performance of the working machine 10, for example, the grain throughput, are each visualized by an indicator element 84, for example. The indicator elements 84 is disposed on the bar display 80, in particular, along the entire scale 82, for example, radially outwardly. The placement of an indicator element 84 along the bar display 80 corresponds to the maximum performance of the assigned parameter and/or unit 14, measured in the unit of the scale 82. For example, an indicator element 86 that is assigned to the cleaning mechanism 38 displays that the grain throughput is limited to approximately 42 t/ha with the current settings. The indicator element 86 is then disposed at 42 t/ha on the bar display according to the scale 82. When viewed together with the central display 78, the operator can therefore see, at a glance, that the grain throughput that can be achieved without changing the settings is approximately 42 t/ha, and that he has already reached 98% of this maximum value.

The operator also can immediately see that optimizing the settings of the cleaning mechanism 38 increases the absolutely achievable throughput, since the indicator element 84, 86 has the lowest value of the displayed indicator elements 84. An indicator element 84, 88, which is assigned to the separating device 32, shows that the separating device 32 would limit the absolutely attainable grain throughput to approximately 49 t/ha if the settings are not changed. It is also possible to display a limitation of the grain throughput by an indicator element 84, 90, which is assigned to the engine load, an indicator element 84, 92, which is assigned to the tailings 48 and an indicator element 84, 94, which is assigned to the grain tailings 76. The individual indicator elements 84, 86, 88, 90, 92, 94 are disposed so as to be dynamically adjustable depending on the settings of the respective underlying parameter and/or working unit.

The display device 54 can depict pictograms 96 on the display unit 56, wherein the pictograms 96 are in the form of an unambiguous symbol in each case to characterize a parameter or a working unit. The pictograms 96 are each assigned to a display element 58 and/or an indicator element 84, 86, 88, 90, 92, 94 in order to characterize the assignment of a display element 58 and/or an indicator element 84, 86, 88, 90, 92, 94 to a parameter and/or a working unit 14.

The operator selects and activates the depicted display elements 58, indicator elements 84, 86, 88, 90, 92, 94, and/or pictograms 96, for example, by making a selection by a touch-sensitive touchscreen monitor. The absolute grain throughput depicted by the bar display 80 in FIG. 2 is increased, for example, by selecting and activating the indicator element 84, 86, which is assigned to the cleaning mechanism 38. This makes it possible to optimize the settings of the cleaning mechanism 38 such that the performance and, therefore, the absolutely achievable grain throughput thereof can be increased.

Settings for parameters and/or working units 14, namely the cleaning mechanism 38 and/or the separating device 32 in this case, are entered automatically and/or manually, for example, by a guided user menu. For example, the operator can set the desired, in particular absolute loss level, which can be achieved by an adjustment of the corresponding working units 14, which is carried out automatically and/or manually, in particular. in a guided manner. In addition, the measured losses and/or the loss display is calibrated automatically thereby making it possible to obtain an absolute loss display 70, 74. This has the advantage that the operator can more easily evaluate a monetary loss. The parameters and/or working units 14 are adjusted via a control/regulating unit and/or a driver assistance system, which is connected to the display device (54).

LIST OF REFERENCE CHARACTERS 10 agricultural working machine
12 combine harvester
14 working unit
16 header
18 crop
20 feed rake
22 crop stream
24 threshing parts
26 first threshing drum
28 second threshing drum
30 guide drum
32 separating device
34 return pan
36 feed pan
38 cleaning mechanism
40 cleaning sieve
42 fan
44 elevator
46 grain tank
48 tailings
50 tailings conveyor device
52 driver's cab
54 display device
56 display unit
58 display element
60 main area
62 center point
64 engine utilization display
66 display area
68 subsection
70 loss display
72 tailings display
74 loss subsection
76 grain tailings
78 central display
80 bar display
82 scale
84 indicator element
86 indicator element—cleaning mechanism
88 indicator element—separating device
90 indicator element—engine utilization
92 indicator element—tailings
94 indicator element—grain tailings
96 pictogram As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. An agricultural working machine, comprising:
at least one working unit; and
a display device for displaying parameters, adjusting parameters or both of the working machine, of the at least one working unit or both;
wherein the display device comprises at least one display unit for visualization of parameter-based values, the display unit having concentrically arranged display elements formed as circular ring sections and at least one bar display;
wherein the at least one bar display at least partially encircles the display elements radially on the outer side;
wherein at least one indicator element for displaying a defined value is disposed on the bar display and represents a parameter, a working unit or both that limits a size of a value underlying the bar display;
wherein a display area of one of the display elements comprises a plurality of subsections to which different parameters are assigned;
wherein the subsections represent a loss display and a tailings display;
wherein the loss display presents a loss of a cleaning mechanism a loss of a separating device and a sum of the subsections in a radial direction corresponding to a total loss of the agricultural working machine; and
wherein the tailings display presents a total volumetric flow rate of tailings, a grain volumetric flow rate as grain tailings and an area ratio of the total volumetric flow rate of the tailings to the grain volumetric flow rate corresponds to a relative ratio of a total volumetric flow rate of the tailings to the grain tailings of the agricultural working machine.

2. The agricultural working machine claim 1, wherein a size of a display area of one of the display elements is dynamically adaptable to a value of at least one parameter assigned to the one of the display elements.

3. The agricultural working machine according to claim 1, wherein a minimum value of a display element, a maximum value of a display element or both is displayed.

4. The agricultural working machine according to claim 1, wherein the display unit comprises a central display disposed concentrically radially within the display elements.

5. The agricultural working machine according to claim 1, wherein at least one pictogram is assigned to each of the display elements, indicator elements or both.

6. The agricultural working machine according to claim 5, wherein on of the at least one parameter, at least one working unit or both that are assigned to the display elements, indicator elements, pictograms or a combination therefore are manually or automatically adjusted by selecting an assigned display element, indicator element, pictogram or combination thereof.

7. The agricultural working machine according to claim 4, wherein the central display visualizes a maximum performance of the agricultural working machine defined by a crop output in tons/hectare, a relative utilization of the agricultural working machine in percent or both.

8. The agricultural working machine according to claim 1, wherein a position of the at least one indicator element corresponds to a maximum performance of visualized parameter, a working unit or both.

9. The agricultural working machine according to claim 1, wherein the at least one display unit can be changed, expanded or both.

10. The agricultural working machine according to claim 1, wherein the at least one display unit comprises a main area for display of the display elements, the bar display, the central display or a combination thereof.

11. The agricultural working machine according to claim 1, further comprising a control/regulating unit, a driver assistance system or both connected to the display device.

* * * * *